United States Patent
Hoydis et al.

(10) Patent No.: US 11,804,860 B2
(45) Date of Patent: Oct. 31, 2023

(54) END-TO-END LEARNING IN COMMUNICATION SYSTEMS

(71) Applicant: NOKIA TECHNOLOGIES OY, Espoo (FI)

(72) Inventors: Jakob Hoydis, Paris (FR); Faycal Ait Aoudia, Saint-Cloud (FR)

(73) Assignee: NOKIA TECHNOLOGIES OY, Espoo (FI)

(*) Notice: Subject to any disclaimer, the term of this patent is extended or adjusted under 35 U.S.C. 154(b) by 366 days.

(21) Appl. No.: 17/291,477

(22) PCT Filed: Nov. 23, 2018

(86) PCT No.: PCT/EP2018/082454
§ 371 (c)(1),
(2) Date: May 5, 2021

(87) PCT Pub. No.: WO2020/104045
PCT Pub. Date: May 28, 2020

(65) Prior Publication Data
US 2022/0006477 A1    Jan. 6, 2022

(51) Int. Cl.
*H04B 1/00*    (2006.01)
*G06N 3/08*    (2023.01)
(Continued)

(52) U.S. Cl.
CPC ............ *H04B 1/0003* (2013.01); *G06N 3/045* (2023.01); *G06N 3/08* (2013.01); *H04B 1/40* (2013.01)

(58) Field of Classification Search
CPC .......... H04B 1/00; H04B 1/0003; H04B 1/10; H04B 1/40; G06N 3/045; G06N 3/08
See application file for complete search history.

(56) References Cited

U.S. PATENT DOCUMENTS 9,824,692 B1    11/2017 Khoury et al.
11,113,605 B2 *   9/2021 Czarnecki .............. G06N 20/20
(Continued)

FOREIGN PATENT DOCUMENTS

CN    108540330 A    9/2018

OTHER PUBLICATIONS

Notification of the First Office Action dated Jan. 20, 2022 corresponding to Chinese Patent Application No. 2018800997168, with English summary thereof.
(Continued)

*Primary Examiner* — Siu M Lee
(74) *Attorney, Agent, or Firm* — SQUIRE PATTON BOGGS (US) LLP (57) ABSTRACT

An apparatus, method and computer program performs initializing parameters of a transmission system. The transmission system comprises a transmitter, a first channel, a relay, a second channel and a receiver. The transmitter includes a transmitter algorithm having trainable weights, the relay includes a relay algorithm having trainable weights and the receiver includes a receiver algorithm having trainable weights. A first training sequence of messages is received, and the first training sequence of messages is sent from the transmitter to the relay using the first channel and is sent from the relay to the receiver using the second channel. A loss function is obtained or generated, and trainable parameters of the transmission system are updated based on the loss function. The trainable parameters include some of the trainable weights of the transmitter, some of the trainable weights of the relay, and some of the trainable weights of the receiver.

19 Claims, 7 Drawing Sheets

(51) Int. Cl.
H04B 1/40 (2015.01)
G06N 3/045 (2023.01)

(56) References Cited

U.S. PATENT DOCUMENTS

| | | | |
|---|---|---|---|
| 2017/0290024 A1 | 10/2017 | Ouyang et al. | |
| 2018/0075849 A1 | 3/2018 | Khoury et al. | |
| 2021/0374529 A1* | 12/2021 | Ait Aoudia | G06N 3/084 |
| 2022/0004848 A1* | 1/2022 | Hoydis | G06N 3/063 |

OTHER PUBLICATIONS

Sebastian Dörner et al., "Deep Learning-Based Communication over the Air," arXiv:1707.03384v1, Arxiv.org, Jul. 11, 2017.

Tim O'Shea et al., "An Introduction to Machine Learning Communications Systems," Arxiv.org, arXiv:1702.00832v1, pp. 1-10, Feb. 2, 2017.

Timothy O'Shea et al., "An Introduction to Deep Learning for the Physical Layer," IEEE Transactions on Cognitive Communications and Networking, vol. 3, No. 4, Dec. 2017.

First Examination Report dated Mar. 23, 2022 corresponding to Indian Patent Application No. 202147027690.

International Search Report & Written Opinion dated Aug. 27, 2019 corresponding to International Patent Application No. PCT/EP2018/082454.

Sebastian Dorner et al., "Deep Learning-Based Communication Over the Air," Arxiv.org, Cornell University Library, Jul. 11, 2017, XP081279898.

Timothy J. O'Shea et al., "An Introduction to Machine Learning Communications Systems," Arxiv.org, Cornell University Library, Feb. 2, 20217, XP080746465.

Timothy O'Shea et al., "An Introduction to Deep Learning for the Physical Layer," IEEE Transactions on Cognitive Communications and Networking, Dec. 1, 2017, pp. 563-575, XP55569291.

* cited by examiner

END-TO-END LEARNING IN COMMUNICATION SYSTEMS

FIELD

The present specification relates to learning in communication systems.

BACKGROUND

A simple communications system includes a transmitter, a transmission channel, and a receiver. The design of such communications systems may involve the separate design and optimisation of each part of the system. An alternative approach is to consider the entire communication system as a single system and to seek to optimise the entire system. Although some attempts have been made in the prior art, there remains scope for further developments in this area.

SUMMARY

In a first aspect, this specification describes an apparatus comprising: means for initialising parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; means for receiving a first training sequence of messages at the receiver, wherein the first training sequence of messages is sent from the transmitter to the at least one relay using the first channel and is sent from the at least one relay to the receiver using the second channel; means for obtaining or generating a loss function; and means for updating trainable parameters of the transmission system based on the loss function, wherein the trainable parameters include at least some of the trainable weights of the transmitter, at least some of the trainable weights of the at least one relay, and at least some of the trainable weights of the receiver.

Some embodiments comprise means for repeating the updating of the trainable parameters of the transmission system until a first condition is reached. The first condition may comprise a defined number of iterations and/or a defined performance level.

The loss function may be generated based on the first training sequence of messages received at the receiver and knowledge of the training sequence.

In some embodiments, the transmission system may further comprise a third channel, wherein the transmitter is in communication with the receiver via the third channel. The receiver may receive transmissions from the transmitter via the at least one relay and the third channel during different time intervals.

In some embodiments, the transmitter comprises a first user equipment, the receiver comprises a second user equipment, and the at least one relay comprises a base station.

The transmission system may comprise a plurality of relays between the transmitter and the receiver. By way of example, the plurality of relays may be arranged in parallel and/or in series.

The first channel and the second channel may comprise different transmission mediums (such as acoustic and wireless channels).

The loss function may be related to one or more of block error rate, bit error rate and categorical cross-entropy.

In some embodiments, said at least some weights of the transmitter, relay and receiver algorithms may be trained using stochastic gradient descent.

The transmitter algorithm may comprise a transmitter neural network. Alternatively, or in addition, the relay algorithm may comprise a first relay neural network. Alternatively, or in addition, the receiver algorithm may comprise a receiver neural network.

The said means may comprise: at least one processor; and at least one memory including computer program code, the at least one memory and the computer program configured, with the at least one processor, to cause the performance of the apparatus.

In a second aspect, this specification describes a method comprising: initialising parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; receiving a first training sequence of messages at the receiver, wherein the first training sequence of messages is sent from the transmitter to the at least one relay using the first channel and is sent from the at least one relay to the receiver using the second channel; obtaining or generating a loss function; and updating trainable parameters of the transmission system based on the loss function, wherein the trainable parameters include at least some of the trainable weights of the transmitter, at least some of the trainable weights of the at least one relay, and at least some of the trainable weights of the receiver.

The updating of the trainable parameters of the transmission system may be repeated until a first condition is reached (such as a defined number of iterations and/or a defined performance level).

The loss function may be generated based on the first training sequence of messages received at the receiver and knowledge of the training sequence.

The transmission system may further comprise a third channel, wherein the transmitter is in communication with the receiver via the third channel. The receiver may receive transmissions from the transmitter via the at least one relay and the third channel during different time intervals.

The loss function may be related to one or more of block error rate, bit error rate and categorical cross-entropy.

In some embodiments, said at least some weights of the transmitter, relay and receiver algorithms may be trained using stochastic gradient descent.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: initialise parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; receive a first training sequence of messages at the receiver, wherein the first training sequence of messages is sent from the transmitter to the at least one relay using the first channel and is sent from the at least one relay to the receiver using the second channel; obtain or generate a loss function; and update trainable parameters of the transmission system based on the loss function, wherein the trainable parameters include at least some of the trainable weights of the transmitter, at least some of the trainable weights of the at least one relay, and at least some of the trainable weights of the receiver.

In a sixth aspect, this specification describes a computer-readable medium (such as a non-transitory computer readable medium) comprising program instructions stored thereon for performing at least the following: initialising parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; receiving a first training sequence of messages at the receiver, wherein the first training sequence of messages is sent from the transmitter to the at least one relay using the first channel and is sent from the at least one relay to the receiver using the second channel; obtaining or generating a loss function; and updating trainable parameters of the transmission system based on the loss function, wherein the trainable parameters include at least some of the trainable weights of the transmitter, at least some of the trainable weights of the at least one relay, and at least some of the trainable weights of the receiver.

In a seventh aspect, this specification describes an apparatus comprising: at least one processor; and at least one memory including computer program code which, when executed by the at least one processor, causes the apparatus to: initialise parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; receive a first training sequence of messages at the receiver, wherein the first training sequence of messages is sent from the transmitter to the at least one relay using the first channel and is sent from the at least one relay to the receiver using the second channel; obtain or generate a loss function; and update trainable parameters of the transmission system based on the loss function, wherein the trainable parameters include at least some of the trainable weights of the transmitter, at least some of the trainable weights of the at least one relay, and at least some of the trainable weights of the receiver.

In an eighth aspect, this specification describes an apparatus comprising: an initialisation module for initialising parameters of a transmission system, wherein the transmission system comprises a transmitter, a first channel, at least one relay, a second channel and a receiver, wherein the transmitter includes a transmitter algorithm having at least some trainable weights, the at least one relay includes a relay algorithm having at least some trainable weights and the receiver includes a receiver algorithm having at least some trainable weights; a receiver input for receiving a first training sequence of messages at the receiver, wherein the first training sequence of messages is sent from the transmitter to the at least one relay using the first channel and is sent from the at least one relay to the receiver using the second channel; a loss function module for obtaining or generating a loss function; and a control module for updating trainable parameters of the transmission system based on the loss function, wherein the trainable parameters include at least some of the trainable weights of the transmitter, at least some of the trainable weights of the at least one relay, and at least some of the trainable weights of the receiver.

BRIEF DESCRIPTION OF THE DRAWINGS

Example embodiments will now be described, by way of non-limiting examples, with reference to the following schematic drawings, in which.

DETAILED DESCRIPTION

Figure 1:
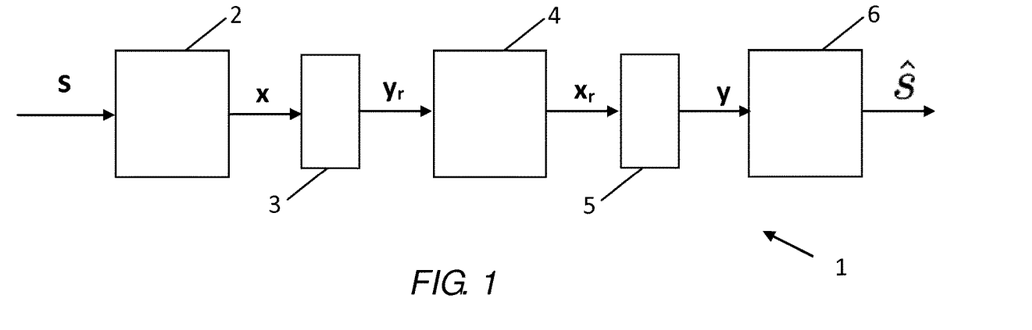
FIG. 1 is a block diagram of a communication system in accordance with an example embodiment.

FIG. 1 is a block diagram of an exemplary communication system, indicated generally by the reference numeral 1, in which exemplary embodiments may be implemented. The system 1 includes a transmitter 2, a first channel 3, a relay 4, a second channel 5 and a receiver 6. Viewed at a system level, the system 1 converts an input symbol (s) (also called a message) received at the input to the transmitter 2 into an output symbol (ŝ) at the output of the receiver 6.

The transmitter 2 implements a transmitter algorithm and the receiver 6 implements a receiver algorithm. As discussed in detail described in detail below, the transmitter and receiver algorithms may be implemented as differentiable parametric functions and may each include at least some trainable weights.

The relay 4 may be provided, for example, to improve the link quality between the transmitter 2 and the receiver 6, such that the communication performance may be improved. The relay 4 may take the form of an amplify-and-forward relay, in which an amplified version of an analogue waveform received at the relay is output by the relay. The relay 4 may take the form of a decode-and-forward relay, in which a signal received at the relay is first decoded, and the re-encoded for transmission. As described further below, the relay algorithm may be implemented as a differentiable parametric function and may include at least some trainable weights.

Figure 2:
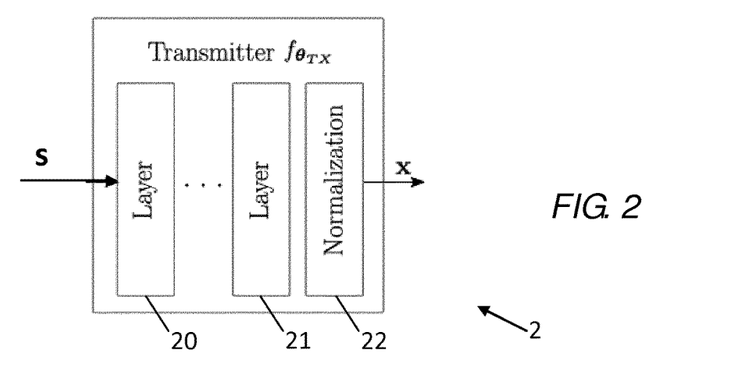
FIG. 2 is a block diagram of an example implementation of a transmitter of the communication system of FIG. 1.
Figure 3:
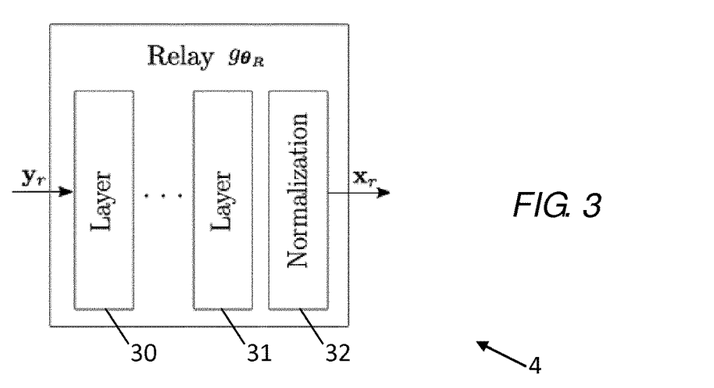
FIG. 3 is a block diagram of an example implementation of a relay of the communication system of FIG. 1.
Figure 4:
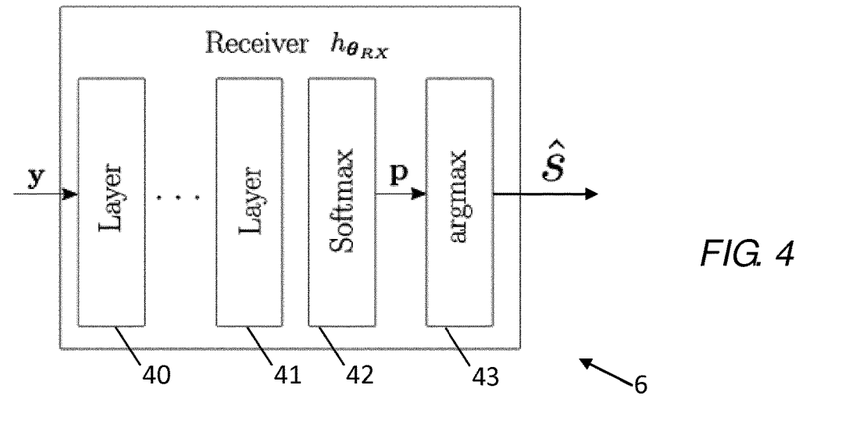
FIG. 4 is a block diagram of an example implementation of a receiver of the communication system of FIG. 1.

The system 1 therefore provides an autoencoder implementing an end-to-end communication system. The autoencoder may be trained with respect to an arbitrary loss function that is relevant for a certain performance metric, such as block error rate (BLER). (The terms 'autoencoder' and 'communication system' may both be used to describe the system 1.) FIGS. 2 to 4 are block diagrams showing details of example implementations of the transmitter 2, relay 4 and receiver 6 of the communication system 1 respectively.

As shown in FIG. 2, the transmitter 2 includes a dense layer of one or more units 20, 21 (e.g. including one or more neural networks) and a normalization module 22. The dense layers 20, 21 may include an embedding module. The modules within the transmitter 2 are provided by way of example and modifications are possible.

As shown in FIG. 3, the relay 4 includes a dense layer of one or more units 30, 31 (e.g. including one or more neural networks) and a normalization module 32. The dense layers 30, 31 may include an embedding module. The modules within the relay 4 are provided by way of example and modifications are possible.

As shown in FIG. 4, the receiver 6 includes a dense layer of one or more units 40, 41 (e.g. including one or more neural networks), a softmax module 42 and an arg max module 43. As described further below, the output of the softmax module 42 is a probability vector that is provided to the input of the arg max module 43. Thus, the receiver may generate a probability distribution p over the M possibly sent messages by leveraging the softmax layer, and hard decoding may be achieved by taking the message with the highest probability. The modules within the receiver 6 are provided by way of example and modifications are possible.

In the system 1, the transmitter 2 seeks to communicate one out of M possible messages $s \in \mathcal{M} = \{1, 2, \ldots, M\}$ to the receiver 6. However, the outputs of the transmitter are not sent directly to the receiver. Instead, the relay 4 receives the transmissions from the transmitter 2 and forwards the transmissions to the receiver 6.

The transmitter 2 sends a complex-valued vector representation $x=x(s) \in \mathbb{C}^n$ of the message through the first channel 3. Generally, the transmitter hardware imposes constraints on x, e.g. an energy constraint $\|x\|_2^2 \le n$, an amplitude constraint $|x_i| \le 1 \forall i$, or an average power constraint $\mathbb{E}[|x_i|^2] \le 1 \forall i$. The first channel 3 is described by the conditional probability density function (pdf) $p_1(y_r|x)$, where $y_r \in \mathbb{C}^n$ denotes the signal received at the relay 4. Upon reception of $y_r$, the relay 4 produces the vector $x_r \in \mathbb{C}^n$ which is transmitted through the second channel 5 to the receiver 6.

Similar to x, $x_r$ typically also needs to satisfy certain constraints related to the hardware of the relay 4. The output of the second channel $y \in \mathbb{C}^n$, which is described by the conditional probability density function (pdf) $p_2(y|x_r)$, is used by the receiver 6 to produce the estimate ŝ of the transmitted message s. This is done by selecting the index ŝ of the largest element of the probability vector $p \in \mathbb{R}_+^M$, which results from the softmax layer in the receiver neural network.

The transmitter 2, relay 4 and the receiver 6 may be implemented as neural networks having parameter vectors $\theta_{TX}$, $\theta_R$ and $\theta_{RX}$ respectively. Thus, the transmitter, relay and receiver may implement respectively the following functions:

$$f_{\theta_{TX}} : \mathcal{M} \mapsto \mathbb{C}^n \quad (1)$$

$$g_{\theta_R} : \mathbb{C}^n \mapsto \mathbb{C}^n \quad (2)$$

$$h_{\theta_{RX}} : \mathbb{C}^n \mapsto \left\{ p \in \mathbb{R}_+^M \,\bigg|\, \sum_{i=1}^M p_i = 1 \right\} \times \mathcal{M} \quad (3)$$

Where $\theta_{TX}$, $\theta_R$ and $\theta_{RX}$ are trainable parameters. In some embodiments, these functions are implemented as neural networks and the parameters correspond to their trainable weights (and biases).

As shown in FIGS. 2 and 3, the last layers of the transmitter 2 and the relay 4 may be the normalization layers 22 and 32 respectively. The normalization layers may be provided to ensure that the relevant power constraints are satisfied.

If the mappings $f_{\theta_{TX}}$, $g_{\theta_R}$ and $h_{\theta_{RX}}$ are differentiable, and if a differentiable channel model for the channels 3 and 5 are available so that they can be used as intermediate non-trainable layers, the entire communication system 1 can be seen as a single differentiable functions (such as a neural network) with a parameters vector $\theta=(\theta_T, \theta_R, \theta_{RX})$, which defines the mapping:

$$\bar{f}_\theta : \mathcal{M} \mapsto \left\{ p \in \mathbb{R}_+^M \,\bigg|\, \sum_{i=1}^M p_i = 1 \right\} \times \mathcal{M}. \quad (4)$$

The differentiable end-to-end system can then be trained in a supervised manner (for example using a stochastic gradient descent (SGD) algorithm), as discussed further below.

Figure 5:
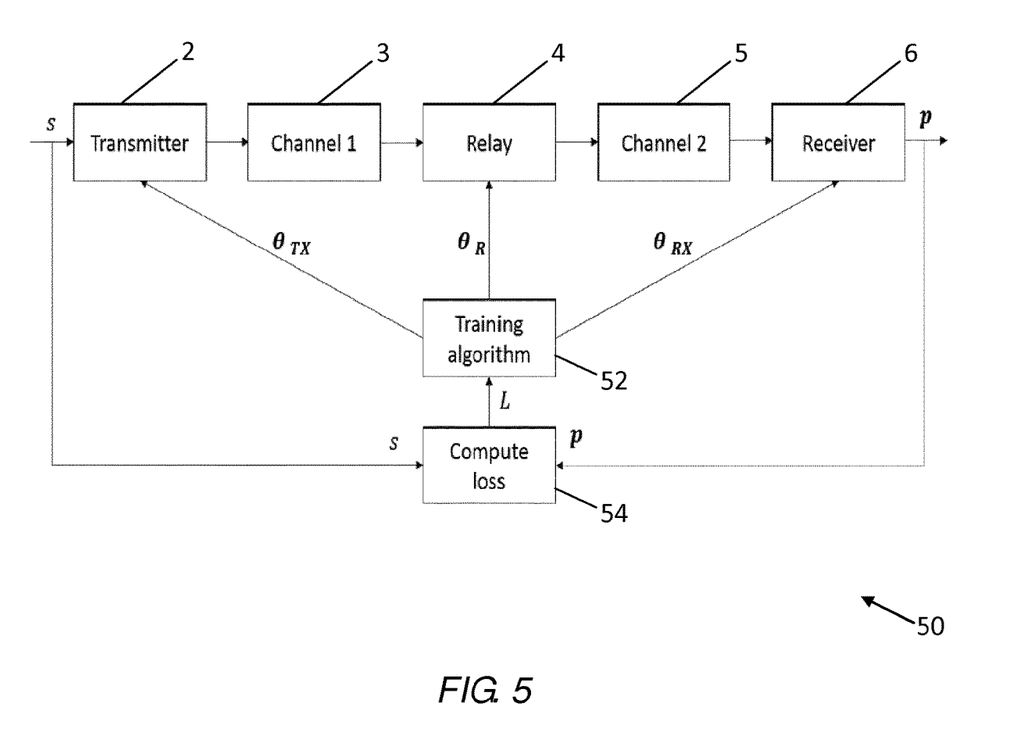
FIG. 5 is a block diagram of a communication system in accordance with an example embodiment.

FIG. 5 is a block diagram of a communication system, indicated generally by the reference numeral 50, in accordance with an example embodiment. The system 50 comprises the transmitter 2, the first channel 3, the relay 4, the second channel 5 and the receiver 6 of the system 1 described above. The system 50 also comprises a training algorithm 52 and a loss function computation module 54.

As described further below, the loss function computation module 54 receives a training sequence of messages as provided to the transmitter 2 and the corresponding messages from the output of the receiver 6 and uses those messages to generate a loss function L. As described further below, the training algorithm 52 updates the trainable parameters of the transmission system ($\theta_T$, $\theta_R$, $\theta_{RX}$) based on the loss function.

Figure 6:
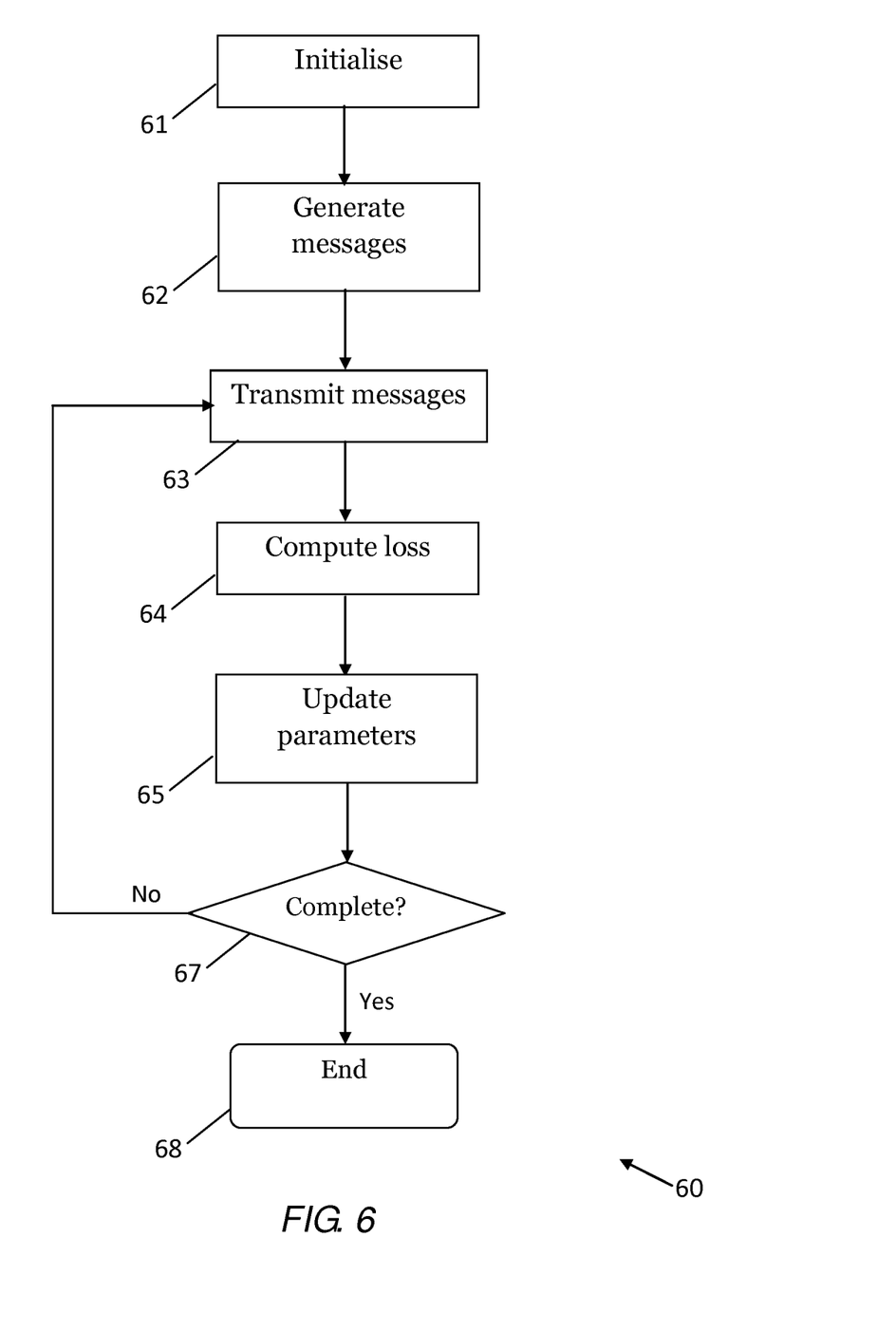
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 demonstrates an example use of the system 50.

The algorithm 60 starts at operation 61, where the transmission system 1 is initialised (e.g. the transmitter 2, the relay 4 and the receiver 6 may be initialised), thereby providing a means for initialising parameters of the transmission system. The initialisation at operation 61 may take many forms, including a random (or pseudo-random) initialisation, or using (or being based on) a previously known configuration.

At operation 62, a set of N messages $\mathcal{S} = \{s_i, i=1, \ldots, N\}$ is generated uniformly from $\mathcal{M}$.

At operation 63, the messages are transmitted from the transmitter 2 to the receiver 6 (via the relay 4). The receiver 6 then computes $\{p_i, \hat{s}_i\} = f_\theta(s_i)$ for i=1, ..., N. (Where $\theta = (\theta_T, \theta_R, \theta_{RX})$, as discussed above.)

At operation 64, knowledge of the transmitted messages $s_i$ and the received output $p_i$ are used to compute the loss:

$$L = \frac{1}{N}\sum_{i=1}^{N} -\log([p_i]_{s_i},$$

where $-\log([p_i]_{s_i}$ is the categorical cross entropy between the input message and the output vector $p_i$.

At operation 65, the trainable parameters of the transmission system are updated based on the loss function generated in operation 64. For example, one step of stochastic gradient descent (SGD) may be applied to the trainable parameters (or weights) of the neural network(s).

At operation 67, a determination is made regarding whether the algorithm 60 is complete. If so, the algorithm terminates at operation 68, otherwise, the algorithm returns to operation 62 and the operations 62 to 67 are repeated. The operation 67 may determine that the algorithm is complete in a number of ways, such as after a number of iterations of the operations 62 to 65 have been completed, if the loss has reached or is below a certain value, if the loss has not decreased over a fixed number of iterations etc.

The systems 1 and 50 may take many forms, some of which are discussed below. Moreover, many variants of the algorithm 60 are possible. The skilled person will be aware of many further arrangements.

In one example implementation, the transmitter 2 and the receiver 6 are user equipments (UEs) or new radios (NRs). In such an implementation, the relay 4 may be a base station (BS) or an enB. Thus, a first UE 2 may communicate with a base station 4 via a first channel 3 and a second UE 6 may communication with the base station 4 via a second channel 5.

In an alternative implementation, the transmitter 2 may be a first eNB, the relay 4 may be a second eNB and the receiver 6 a user equipment (UE). Clearly, the roles of the first eNB and the UE in this example can be exchanged, depending on whether uplink or downlink transmissions are considered.

The first and second channels 3 and 5 may take many forms. For example, the channels may be optical fibre channels. In such an example, the relay 4 may be an amplifier, which amplifier may be needed for optical transmissions over long distances.

In some embodiments, the dimensions of x (the output of the transmitter 2), $y_r$ (the input of the relay 4), $x_r$ (the output of the relay 4) and y (the input of the receiver) may all be different.

In some embodiments, the transmitter and the relay may transmit over different frequency bands.

It should also be noted that the batch size N as well as the learning rate (and possibly other parameters of the chosen SGD variant, e.g. ADAM, RMSProp, Momentum etc.) could be optimization parameters of the training operations described above.

Figure 7:
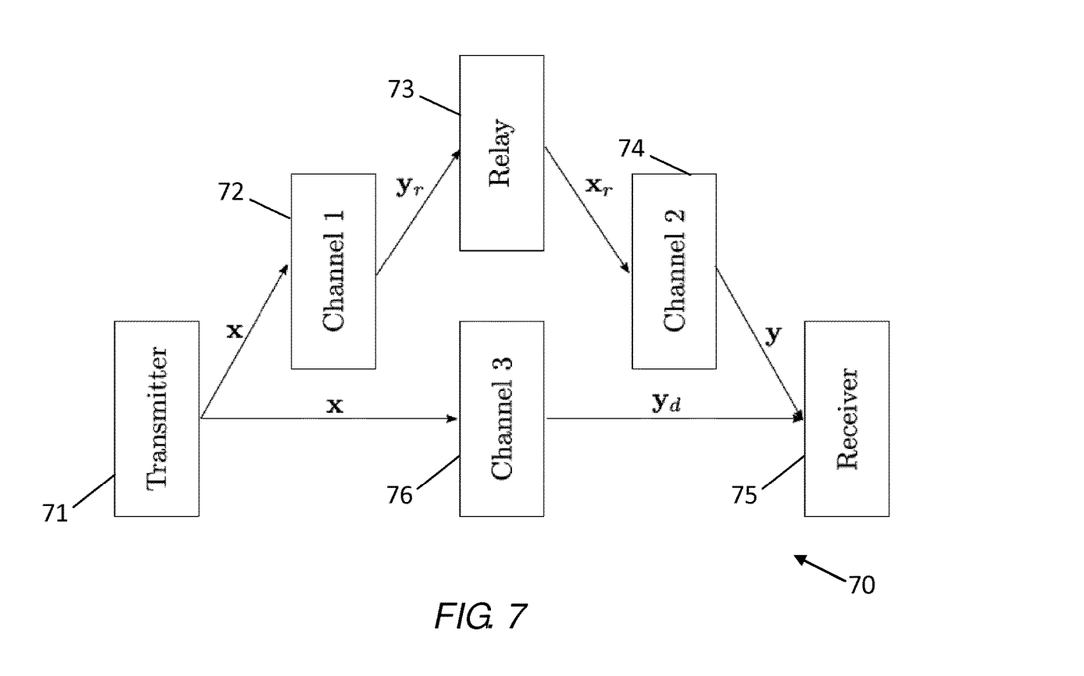
FIGS. 7 to 10 are block diagrams of example communication systems in accordance with example embodiments.

FIG. 7 is a block diagram of a communication system, indicated generally by the reference numeral 70, in accordance with an example embodiment. The system 70 comprising a transmitter 71, a first channel 72, a relay 73, a second channel 74 and a receiver 75 (similar to the transmitter 2, first channel 3, relay 4, second channel 5 and receiver 6 described above). In addition, the system 70 comprises a third channel 76 providing a direct communications link between the transmitter 71 and the receiver 75.

By way of example, the system 70 may be a wireless broadcast system in which the relay 73 is used to boost a signal being sent from the transmitter 71 to the receiver 73 in which a direct channel 76 is also present between the transmitter and the receiver. The third channel 76 may provide a relative weak communication link between the transmitter 71 and receiver 75.

Thus, the receiver 75 may receive a signal $y_d(t) \in \mathbb{C}^n$ over the third channel 76 as well as the signal y(t) from the relay 73, where t indicates the number of the transmission interval. In some circumstances, it may be possible for transmissions from the transmitter 71 and the relay 73 received at the receiver 75 to interfere with each other. A number of options exist for handling this issue.

In one embodiment, the receiver receives transmissions from the transmitter via at least one relay and the third channel during different time intervals. For example, the transmitter 71 may transmit during a first time interval t, whilst the relay 73 transmits during a second time interval t+1. In this case, the input to the receiver 75 may be a stacked vector of both observations $[y(t+1)^H, y_d(t)^H]^H \mathbb{C}^{2n}$ (where $y(t+1)^H$ is received from the relay and $y_d(t)^H$ is received directly. Whilst conceptually simple, such an arrangement is inefficient, since some potentially available transmission slots are not used.

In another embodiment, the transmitter 71 sends a new message during the second transmit interval t+1, such that the input to the receiver 75 is $[y_d(t+1)^H, (t)^H]^H \in \mathbb{C}^{2n}$. The relay 73 can either be silent during the first transmission interval (i.e. $x_r(t)=0$) or transmit a signal related to a previously transmitter message (e.g. $x_r(t)=g_{\theta R}(y_r(t-1))$).

Alternatively, the transmitter 71 may send the same message during the second transmit interval (i.e. sending the same message twice).

In another embodiment, the transmitter 71 may send a first part of a message in the first transmission interval and a second part of a message during the second transmit interval. In this case, the transmitter may implement the mapping $f_{\theta_{TX}}: \mathcal{M} \mapsto \mathbb{C}^{2n}$, where the first n elements of the output correspond to the first part of the message and the second n elements of the output correspond to the second part of the message.

In yet another embodiment, the relay 73 may send a second part of a previously transmitted message in the first transmission interval and a first part of a current message during the second transmit interval. In this case, the relay implements the mapping $g_{\theta_R}: \mathcal{M} \mapsto \mathbb{C}^{2n}$, where the first n elements of the output correspond to the first part of the message and the second n elements of the output correspond to the second part of the message.

Figure 8:
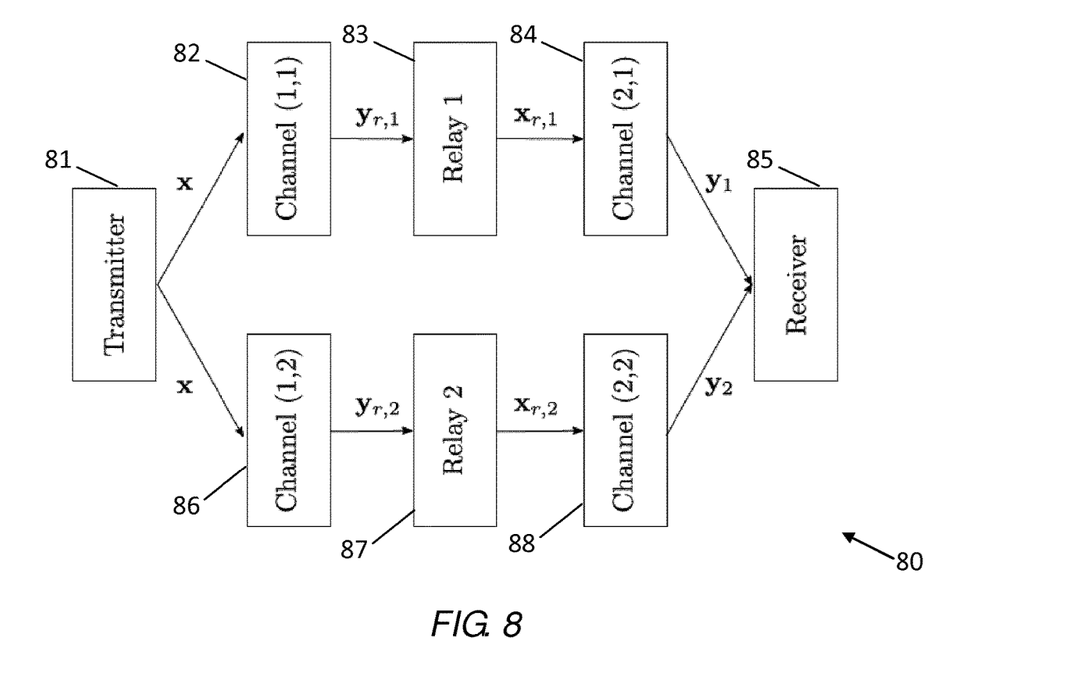
Figure 9:
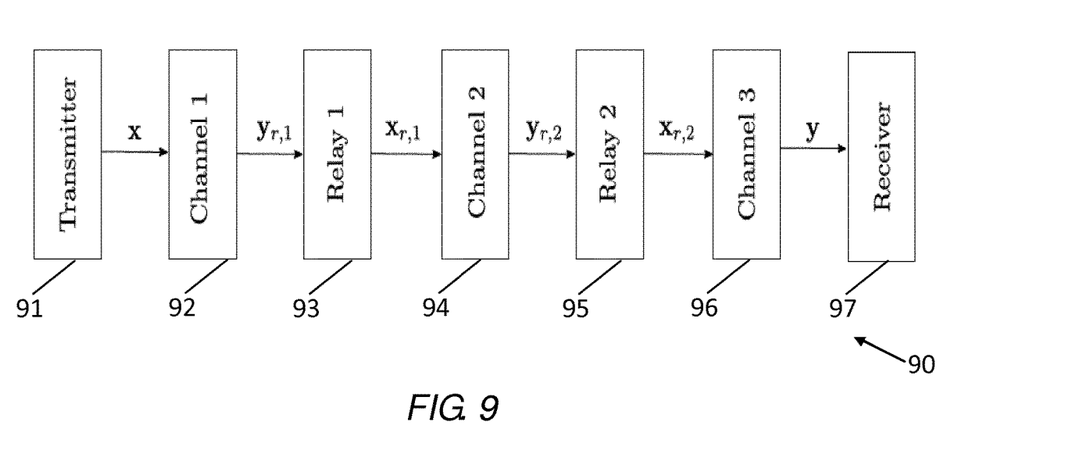

The embodiments described above include a single relay provided between a transmitter and a receiver. This is not essential. For example, a plurality of relays may be provided. Said relays may be provided in parallel and/or in series. In one embodiment, multiple relays receive a signal from a transmitter over individual channels and forward those signals to a receiver (an example for two relays is shown in FIG. 8). In another embodiment, a chain of relays is provided for forwarding a message from a transmitter to a receiver in a sequential manner (an example for two relays is shown in FIG. 9). A sequential series of relays may, for example, be provided for boosting a signal over relatively large distances. An example of such as system is a fibre optic transmission system.

FIG. 8 is a block diagram of a communication system, indicated generally by the reference numeral 80, in accordance with an example embodiment. The system 80 comprising a transmitter 81, a first channel 82, a first relay 83, a second channel 84 and a receiver 85 (similar to the transmitter 2, first channel 3, relay 4, second channel 5 and receiver 6 described above). In addition, the system 80 comprises a third channel 86, a second relay 87 and a fourth channel 88 providing a communications link between the transmitter 81 and the receiver 85.

FIG. 9 is a block diagram of a communication system, indicated generally by the reference numeral 90, in accordance with an example embodiment. The system 90 comprises a chain of relays provided in series. Thus, the system 90 comprises a transmitter 91, a first channel 92, a first relay 93, a second channel 94, a second relay 95, a third channel 96 and a receiver 97.

Figure 10:
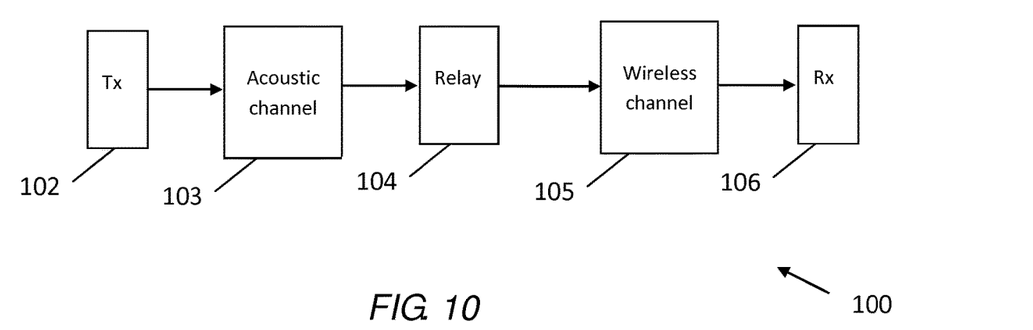

A channel by which data is received at an input of a relay may be different to a channel by which data is output by a relay. In such examples, the relay may be provided for interfacing between different channel types (instead or, or in addition to, providing an amplifying function). By way of example, FIG. 10 is a block diagram of a communication system, indicated generally by the reference numeral 100, in accordance with an example embodiment, in which channels having different forms are provided. The system 100 comprises a transmitter 102, a first channel 103, a relay 104, a second channel 105 and a receiver 106. Thus, the system 100 has many similarities with the system 1 described above with reference to FIG. 1. In the system 100, the first channel 103 is an acoustic channel and the second channel 105 is a wireless channel. Such an implementation may allow an underwater sensor to communicate with an airborne node. Of course, the first and second channels may take different forms. In another example, the first channel may be a LiFi channel and the second channel may be an optical fibre channel.

Figure 11:
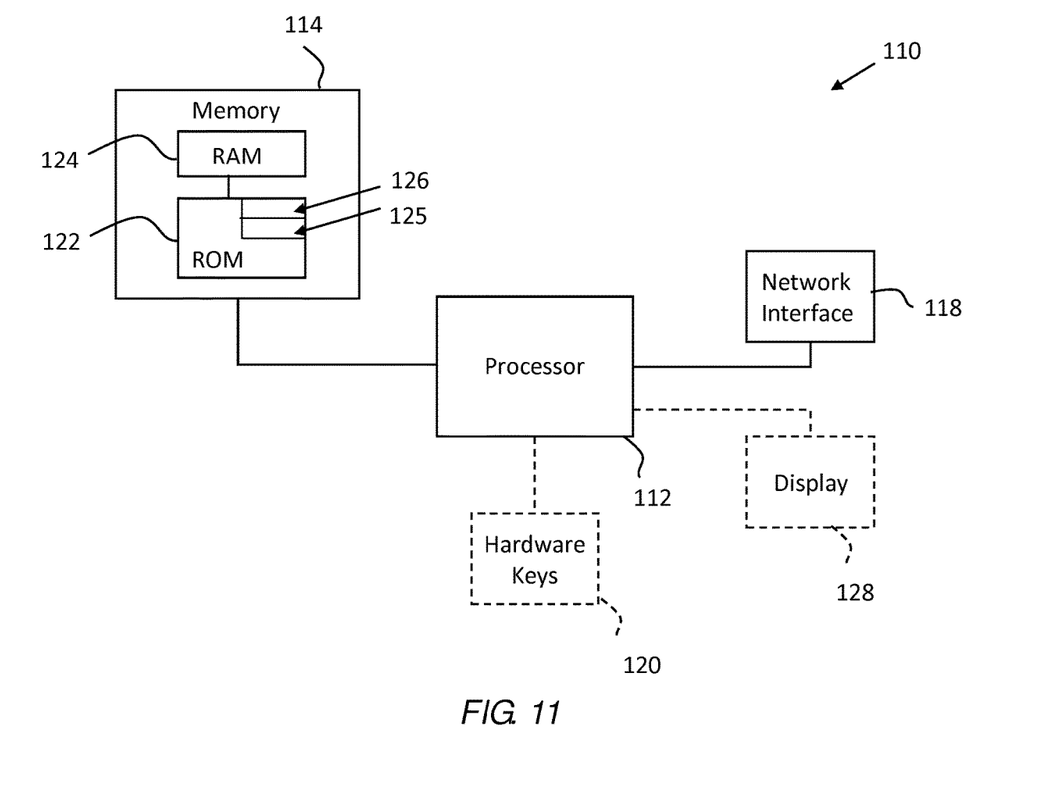
FIG. 11 is a block diagram of a components of a system in accordance with an example embodiment.

For completeness, FIG. 11 is a schematic diagram of components of one or more of the modules described previously (e.g. the transmitter or receiver neural networks), which hereafter are referred to generically as processing systems 110. A processing system 110 may have a processor 112, a memory 114 closely coupled to the processor and comprised of a RAM 124 and ROM 122, and, optionally, hardware keys 120 and a display 128. The processing system 110 may comprise one or more network interfaces 118 for connection to a network, e.g. a modem which may be wired or wireless.

The processor 112 is connected to each of the other components in order to control operation thereof.

The memory 114 may comprise a non-volatile memory, a hard disk drive (HDD) or a solid state drive (SSD). The ROM 122 of the memory 114 stores, amongst other things, an operating system 125 and may store software applications 126. The RAM 124 of the memory 114 is used by the processor 112 for the temporary storage of data. The operating system 125 may contain code which, when executed by the processor, implements aspects of the algorithm 60.

The processor 112 may take any suitable form. For instance, it may be a microcontroller, plural microcontrollers, a processor, or plural processors.

The processing system 110 may be a standalone computer, a server, a console, or a network thereof.

In some embodiments, the processing system 110 may also be associated with external software applications. These may be applications stored on a remote server device and may run partly or exclusively on the remote server device. These applications may be termed cloud-hosted applications. The processing system 110 may be in communication with the remote server device in order to utilize the software application stored there.

Figure 12A:
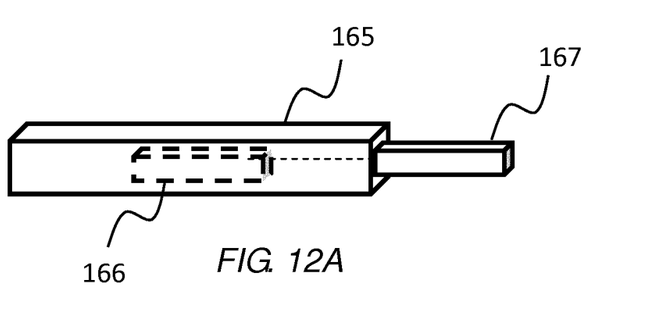
FIGS. 12A and 12B show tangible media, respectively a removable memory unit and a compact disc (CD) storing computer-readable code which when run by a computer perform operations according to embodiments.
Figure 12B:
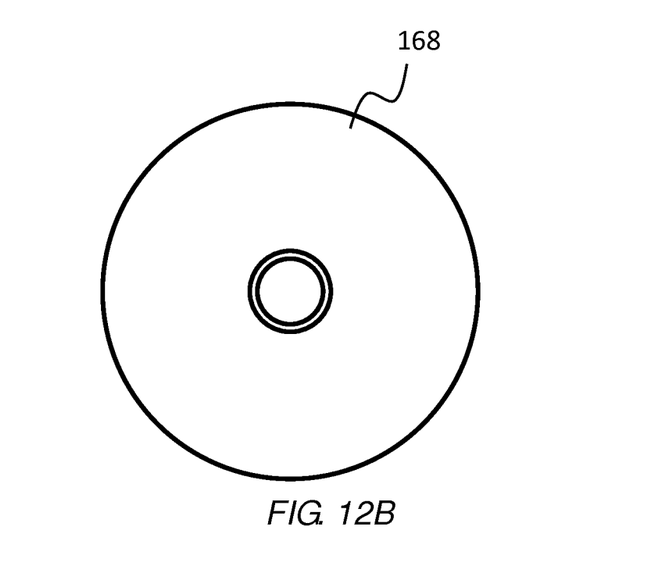

FIGS. 12A and 12B show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory containing computer program code, the at least one memory and computer program code being configured, with the processor, to cause the apparatus to perform:
   initializing parameters of a transmission system, wherein the transmission system comprises a transmitter, a first channel, at least one relay, a second channel and a receiver, wherein the transmitter includes a transmitter algorithm having trainable weights, the at least one relay includes a relay algorithm having trainable weights and the receiver includes a receiver algorithm having trainable weights;
   receiving a first training sequence of messages at the receiver, wherein the first training sequence of messages is sent from the transmitter to the at least one relay using the first channel and is sent from the at least one relay to the receiver using the second channel;
   obtaining or generating a loss function; and
   updating trainable parameters of the transmission system based on the loss function, wherein the trainable parameters include at least some of the trainable weights of the transmitter, at least some of the trainable weights of the at least one relay, and at least some of the trainable weights of the receiver.

2. The apparatus as claimed in claim 1, wherein the at least one memory and computer program code are further configured, with the at least one processor, to cause the apparatus to repeat the updating of the trainable parameters of the transmission system until a first condition is reached.

3. The apparatus as claimed in claim 2, wherein the first condition comprises a defined number of iterations or a defined performance level.

4. The apparatus as claimed in claim 1, wherein the loss function is generated based on the first training sequence of messages received at the receiver and knowledge of the training sequence.

5. The apparatus as claimed in claim 1, wherein the transmission system further comprises a third channel, and wherein the transmitter is in communication with the receiver via the third channel.

6. The apparatus as claimed in claim 5, wherein the receiver receives transmissions from the transmitter via the at least one relay and the third channel during different time intervals.

7. The apparatus as claimed in claim 1, wherein the transmitter comprises a first user equipment, the receiver comprises a second user equipment, and the at least one relay comprises a base station.

8. The apparatus as claimed in claim 1, wherein the transmission system comprises a plurality of relays between the transmitter and the receiver.

9. The apparatus as claimed in claim 8, wherein the plurality of relays are arranged in parallel or in series.

10. The apparatus as claimed in claim 1, wherein the first channel and the second channel comprise different transmission mediums.

11. The apparatus as claimed in claim 1, wherein the loss function is related to one or more of block error rate, bit error rate and categorical cross-entropy.

12. The apparatus as claimed in claim 1, wherein said at least some weights of the transmitter, relay and receiver algorithms are trained using stochastic gradient descent.

13. The apparatus as claimed in claim 1, wherein:
   the transmitter algorithm comprises a transmitter neural network; or
   the relay algorithm comprises a first relay neural network; or
   the receiver algorithm comprises a receiver neural network.

14. A method, comprising:
   initializing parameters of a transmission system, wherein the transmission system comprises a transmitter, a first channel, at least one relay, a second channel and a receiver, wherein the transmitter includes a transmitter algorithm having trainable weights, the at least one relay includes a relay algorithm having trainable weights and the receiver includes a receiver algorithm having trainable weights;
   receiving a first training sequence of messages at the receiver, wherein the first training sequence of messages is sent from the transmitter to the at least one relay using the first channel and is sent from the at least one relay to the receiver using the second channel;
   obtaining or generating a loss function; and
   updating trainable parameters of the transmission system based on the loss function, wherein the trainable parameters include at least some of the trainable weights of the transmitter, at least some of the trainable weights of the at least one relay, and at least some of the trainable weights of the receiver.

15. The method as claimed in claim 14, further comprising repeating the updating of the trainable parameters of the transmission system until a first condition is reached.

16. The method as claimed in claim 15, wherein the loss function is generated based on the first training sequence of messages received at the receiver and knowledge of the training sequence.

17. The method as claimed in claim 15, wherein the loss function is related to one or more of block error rate, bit error rate and categorical cross-entropy.

18. The method as claimed in claim 15, wherein said at least some weights of the transmitter, relay and receiver algorithms are trained using stochastic gradient descent.

19. A non-transitory computer readable medium comprising program instructions stored thereon which, when executed in hardware, cause the hardware to perform:

initializing parameters of a transmission system, wherein the transmission system comprises a transmitter, a first channel, at least one relay, a second channel and a receiver, wherein the transmitter includes a transmitter algorithm having trainable weights, the at least one relay includes a relay algorithm having trainable weights and the receiver includes a receiver algorithm having trainable weights;

receiving a first training sequence of messages at the receiver, wherein the first training sequence of messages is sent from the transmitter to the at least one relay using the first channel and is sent from the at least one relay to the receiver using the second channel;

obtaining or generating a loss function; and updating trainable parameters of the transmission system based on the loss function, wherein the trainable parameters include at least some of the trainable weights of the transmitter, at least some of the trainable weights of the at least one relay, and at least some of the trainable weights of the receiver.

* * * * *